United States Patent

[11] 3,624,459

[72] Inventors: John F. Brown, Jr., Schenectady, N.Y.; Donald R. Ochar, Columbia, S.C.; David A. Vermilyea, Schenectady, N.Y.
[21] Appl. No.: 881,852
[22] Filed: Dec. 3, 1969
[45] Patented: Nov. 30, 1971
[73] Assignee: General Electric Company

[54] ELECTROLYTE COMPOSITION FOR WET ELECTROLYTIC CAPACITORS
7 Claims, 2 Drawing Figs.

[52] U.S. Cl. .................................... 317/230, 29/570, 252/62.2
[51] Int. Cl. .................................... H01g 9/02
[50] Field of Search .................................... 317/230, 231, 233

[56] References Cited

UNITED STATES PATENTS

| | | | |
|---|---|---|---|
| 2,757,140 | 7/1956 | Bush .................... | 317/230 X |
| 2,890,394 | 6/1959 | Stephenson et al. ........... | 317/230 |
| 2,934,681 | 4/1960 | Ross ...................... | 317/230 |
| 3,138,746 | 6/1964 | Burger et al. ................ | 317/230 |

Primary Examiner—James D. Kallam
Attorneys—Richard R. Brainard, Paul A. Frank, Charles T. Watts, Leo I. MaLossi, Frank L. Neuhauser, Oscar B. Waddell and Joseph B. Forman ABSTRACT: The use of surface active agents as inhibitory additives to the electrolyte in wet electrolytic capacitors employing aluminum electrodes is described. Each molecule of the inhibiting amphiphilic substances contains a strongly inhibiting hydrophilic group attached to a hydrophobic group.

PATENTED NOV 30 1971   3,624,459

INVENTORS:
JOHN F. BROWN, Jr.
DONALD R. OCHAR
DAVID A. VERMILYEA by *Lui J. Ma Lussi*

THEIR ATTORNEY

ELECTROLYTE COMPOSITION FOR WET ELECTROLYTIC CAPACITORS

BACKGROUND OF THE INVENTION

In the process of preparing wet electrolytic capacitors that employ aluminum electrodes water enters the system either by deliberate introduction as part of the liquid electrolyte or unintentionally as a contaminant in the case of organic liquid electrolytes. This liquid water attacks the anodic oxide (amorphous $Al_2O_3$) causing dissolution thereof followed by the precipitation of a hydroxide, $AlOOH$, from the solution. As the hydroxide layer develops it provides deposition sites close to the surface of the oxide whereby the dissolution may proceed at a high rate.

The typical wet electrolytic capacitor employs an etched surface electrode structure and a number of methods have been developed to produce the desired roughening of the electrode surface. After etching, the electrodes are cleaned, usually by rinsing in water, to remove all traces of any contaminating or foreign materials, which might either affect formation of the requisite dielectric film or affect the performance of the finished capacitor. After cleaning, the aluminum foil to be used as the anode is anodized to form an anodic oxide (predominately amorphous $Al_2O_3$) layer thereon using either a basic or an acidic anodizing electrolyte. Numerous electrolytes for the formation of anodic films are listed on page 55 of the text book "Electrolytic Capacitors" by Paul McKnight Deeley (Recorder Press 1938). The most commonly used anodizing electrolytes are boric acid and inorganic phosphates.

The anodic oxide layer formed substantially uniformly covers all of the etched surface (both sides) of the aluminum foil even extending into and covering the inside surfaces of the small pores.

When the active dielectric film of aluminum oxide has been formed, a typical electrode assembly (anode/paper spacer/cathode/paper spacer) is prepared. This assembly is rolled into a cylindrical configuration and impregnated with (as by immersion) a fill electrolyte for "aging." During the aging process a potential is applied to the electrode assembly equal to or slightly in excess of the rated operating voltage for the completed capacitor for a predetermined period of time. The aging, or reforming, potential tends to repair any breakage or cracking, which may have occurred in the anodic film during the handling and assembly.

When the aging has been completed, the electrode assembly is inserted into an aluminum can and the can is capped and sealed.

Fill electrolytes (as distinguished from anodizing electrolytes) are either nonaqueous (organic solvent) or have a low water content. Ethylene glycol is frequently used, because of its solvent characteristics and low freezing point.

Liquid water attack in the manner described above is particularly severe when the completed capacitor is not in use, e.g., in storage, or on open circuit. When in actual operation, the electric field applied across the anodic oxide film automatically repairs such damage; however, during sustained periods when the capacitor is not in use, this degradation can continue and reduce the dielectric strength of and anodic layer to such a level that the imposition of a normal electrical load may cause failure of the capacitor. It is to this problem of dielectric degradation in wet electrolytic capacitors that this invention and the invention described in U.S. Pat. application Ser. No. 881,853–Vermilyea et al., filed at the same time as the instant application and assigned to the assignee of this invention are directed.

In describing this invention the terms "inhibitor" and "inhibiting" are employed. An inhibitor or inhibiting substance is an agent that will render innocuous a normally hostile environment when added thereto.

DISCUSSION OF THE INVENTION

The instant invention offers in particular a solution to the problem of degradation of the anodic oxide dielectric by liquid water in wet electrolytic capacitors. The water is introduced either by deliberate addition (in the case of capacitors containing aqueous electrolytes) or by inadvertence during manufacture (in the case of capacitors containing nonaqueous electrolytes). The inhibiting substances of this invention are particularly useful in wet electrolytic capacitors that employ organic solvent electrolytes. According to this invention one or more inhibiting substances soluble in the fill electrolyte employed and selected from a specific class having amphiphilic molecules is introduced and remains within the capacitor can (receptacle for the electrode assembly and liquid electrolyte), the amphiphilic molecule comprising a strongly inhibiting hydrophilic (polar) group in combination with a hydrophobic (nonpolar) group. The surface active characteristics of such amphiphilic molecules is solution in the electrolyte results in a concentration of these molecules over all surfaces in contact with the electrolyte. The amphiphilic molecules align themselves in layers over these various surfaces in one of two orientations depending upon the surfaces energy of the particular surface. In the case of low energy surfaces the orientation of amphiphile molecules concentrated at such surfaces is with the hydrophobic group of each molecule absorbed on the surface and the hydrophilic group of each molecule located out away from the surface as far as the length of the hydrophobic group will permit. At high energy surfaces the reverse orientation occurs with each hydrophilic group being adsorbed on the surface and each hydrophobic group extending away from that same surface. A unique situation occurs over the anodic oxide surfaces and any aluminum surfaces with which the electrolyte comes into contact (for these surfaces are normally covered by aluminum oxide), because the special amphiphiles of this invention preferentially adhere to aluminum oxide surfaces in a layered arrangement in which the nature of the attraction between the hydrophilic groups and the aluminum oxide amounts to either a chemical or physical attachment depending upon the particular hydrophilic group. By their very presence and tenacious attachment, therefore, the amphiphilic molecules of this invention impede the reaction between all aluminum oxide surfaces and any liquid water present in the system. In the absence of this chemical or physical attachment as with a layered arrangement of ordinary amphiphiles the outwardly extending hydrophobic group would not provide sufficient impediment to the penetration of liquid water to the aluminum oxide surface to inhibit the destructive reaction therebetween. Thus, protection results for all aluminum surfaces (i.e., cathodes, aluminum cans) and the anodes, whether plain or etched.

BRIEF DESCRIPTION OF THE DRAWING

The exact nature of this invention as well as objects and advantages thereof will be readily apparent from consideration of the following specification relating to the annexed drawing in which.

DESCRIPTION OF THE PREFERRED EMBODIMENT

Figure 1:
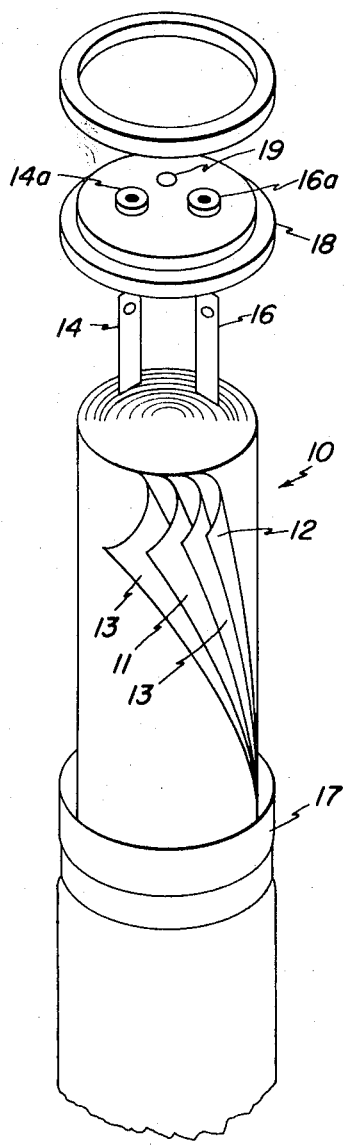
FIG. 1 is an exploded view of an example of an electrolytic capacitor to which the instant invention applies and FIG. 2 is a diagrammatic representation of the process of preparation of electrolytic capacitors according to this invention.

As is shown in FIG. 1, capacitor 10 comprises cooperating electrodes 11, 12 in the form of thin aluminum foils. These electrodes have a thin film of aluminum oxide thereon. Between electrodes 11 and 12 as they are arranged in the electrode assembly are disposed spacers 13 consisting of sheets of absorbent material. Spacers 13 are, or become, impregnated with electrolyte composition. Terminal tabs 14, 16 are provided for establishing electrical contact to the electrodes. After preparation, the electrode assembly is placed in aluminum can 17, which is sealed with cap 18 provided with external terminals 14a, 16a (connected to tabs 14, 16, respectively) and vent plug 19 for the release of excess internal pressure.

Figure 2:
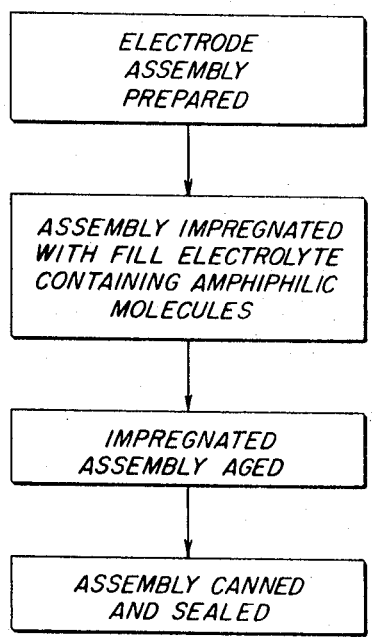

As is described in FIG. 2 the internal construction of the wet electrolytic capacitor 10 has been prepared and the completed unit is to be assembled, a quantity of the inhibitor in the range of from an amount effective to cover a finite portion of the anodic oxide surfaces present with a monolayer of inhibitor to about 10 weight percent is added to thereof into the aluminum can 17. The pH of the liquid electrolyte so modified is adjusted in the range of from 3 to 9 by the addition of appropriate acids and bases such an NaOH or $HClO_4$ in aqueous electrolytes or citric acid or ammonium citrate in organic electrolytes. The optimum ph of 5.0 produces maximum inhibition.

Anionic, nonionic and cationic surface active (amphiphilic) agents have been employed in accordance with this invention and it has been determined that the anionic substances are generally the most effective. Nonionic surface active agents may become more effective with time in solution probably due to entrapment thereof in pores on any hydroxide layer (AlOOH) formed. The anionic amphiphilic inhibitors all produce water-repelling surfaces on the anodic oxide surface showing that the ions become oriented with the hydrophilic group next to the oxide and the hydrophobic group projecting out. The best inhibitors produced surfaces that were extremely hydrophobic.

Comparative data for benzenesulfonate and benzenephosphonate show that phosphonate group is much more effective in its inhibiting action than the sulfonate group. Tests have shown that in order of effectiveness, phosphonate or alkyl phosphate ions are more effective than sulfonate or alkyl sulfate ions, which in turn are more effective than carboxylate ions. Amphiphile molecules of the alkyl phosphate type at pH 5 appeared to provide substantially complete protection from attack, since no corrosion was detectable on the oxide film. This finding was verified by infrared spectroanalysis, which showed that the $Al_2O_3$ infrared absorption was unchanged.

As in disclosed in the aforementioned Vermilyea et al. application disclosing the introduction of specific inorganic ions as inhibitory agents in wet electrolytic capacitors the sulfate-type function is only weakly effective as compared to the phosphate ion. However, for some unexplained reason when attached to an organic group according to this invention the sulfate group becomes very effective. Another unexplained phenomenon is the fact that although inorganic phosphate ions as free inorganic ions do not have effective inhibitory action under conditions of ph of less than 3.0, test results with monododecyl phosphate at pH 1.3 have established that as part of an amphiphile molecule the phosphate group is very effective.

Although the preferred embodiment of this invention is in the protection of anodic oxide films, the special amphiphiles of this invention are broadly applicable to the protection of aluminum with the normal aluminum oxide layer thereover against corrosion. Such protection is afforded by bringing into (and maintaining in) contact with the aluminum surface a liquid having a concentration of amphiphile molecules dissolved therein, the amphiphile molecules containing a hydrophobic group and a hydrophilic group selected from the group consisting of phosphate, phosphonate, siliconate, sulfate, sulfonate, arsenate, arsonate, sulfinate, phosphite, phosphinate, and carboxylate oxyanions. Examples of aliphatic (saturated and unsaturated) and aromatic amphiphiles useful in the practice of this invention are as follows: dodecyl acid phosphate, dodecanesulfonates, monostearylsulfosuccinates, nonanoates, dodecylsulfosuccinates, monolinolenyl phosphate, oleylmethyltaurine, phenylsilanetriol, benzenesulfonates, benzenephosphonates, etc. Sodium, potassium and ammonium salts would be the preferred salts to be used of those amphiphiles generically listed above, e.g., sodium dodecanesulfonate, although other salts may be employed.

What we claim as new and desire to secure by Letters Patent of the United States is:

1. In a wet electrolytic capacitor wherein a housing contains an anodized aluminum anode and a liquid electrolyte and means are attached to said housing for the forming of an external electrical connection thereto, said housing being sealed to prevent leakage of the electrolyte therefrom, the improvement in said combination wherein a quantity of surface active agent ranging from an amount effective to cover a finite portion of said anode with a monomolecular layer to about 10 weight percent is disposed within said housing, said surface active agent being soluble in said electrolyte and having an amphiphilic molecular structure such that individual molecules contain a hydrophobic group and a hydrophilic oxyanion group, the hydrophilic group being selected from the group consisting of phosphate, phosphonate, siliconate, sulfate, sulfonate, arsenate, arsonate, sulfinate, phosphite, phosphinate, and carboxylate oxyanions.

2. The improvement recited in claim 1 wherein the pH of the electrolyte is in the range of from 3.0 to 9.0.

3. The improvement recited in claim 1 wherein the surface active agent is a dodecyl acid phosphate.

4. A method for providing a protective layer on a metallic aluminum surface comprising the step of immersing said surface in liquid having in solution therein a quantity of surface active agent ranging from an amount effective to cover a finite portion of said surface with a monomolecular layer to about 10 weight percent, said surface active agent having an amphiphilic molecular structure such that individual molecules contain a hydrophobic group and a hydrophilic oxyanion group, the hydrophilic group being selected from the group consisting of phosphate, phosphonate, siliconate, sulfate, sulfonate, arsenate, arsonate, sulfinate, phosphite, phosphinate and carboxylate oxyanions.

5. The method of claim 4 wherein the surface active agent is a dodecyl acid phosphate.

6. In the preparation of a wet electrolyte capacitor wherein the following steps are performed: preparing an electrode assembly wherein anode and cathode layers are separated by spacers, said anode layer being made of aluminum foil; impregnating said electrode assembly with a fill electrolyte; "aging" said electrode assembly by the application of electrical potential thereto; introducing said "aged" electrode assembly into a can; and capping and sealing said can, the improvement in said series of steps comprising:

a. dissolving in the fill electrolyte a quantity of surface active agent ranging from an amount effective to cover a finite portion of the surface of said electrode construction with a monomolecular layer to about 10 weight percent, said surface active agent having an amphiphilic molecular structure such that individual molecules contain a hydrophobic group and a hydrophilic oxyanion group, the hydrophilic group being selected from the group consisting of phosphate, phosphonate, siliconate, sulfate, sulfonate, arsenate, arsonate, sulfinate, phosphite, phosphinate, and carboxylate oxyanions.

7. The method of claim 6 wherein the surface active agent is dodecyl acid phosphate.

* * * * *